US008289362B2

(12) United States Patent
Baird

(10) Patent No.: US 8,289,362 B2
(45) Date of Patent: Oct. 16, 2012

(54) AUDIO DIRECTIONALITY CONTROL FOR A MULTI-DISPLAY SWITCHED VIDEO CONFERENCING SYSTEM

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1420 days.

(21) Appl. No.: 11/904,248

(22) Filed: Sep. 26, 2007

(65) Prior Publication Data

US 2009/0079815 A1 Mar. 26, 2009

(51) Int. Cl.
*H04N 7/14* (2006.01)
(52) U.S. Cl. .............. 348/14.08; 348/14.12; 348/14.09
(58) Field of Classification Search .... 348/14.01–14.16; 379/202.01
See application file for complete search history.

(56) References Cited

U.S. PATENT DOCUMENTS

| | | |
|---|---|---|
| 5,483,587 A | 1/1996 | Hogan et al. |
| 5,600,366 A | 2/1997 | Schulman |
| 5,673,253 A | 9/1997 | Shaffer |
| 5,729,687 A | 3/1998 | Rothrock et al. |
| 5,917,830 A | 6/1999 | Chen et al. |
| 5,963,217 A | 10/1999 | Grayson et al. |
| 6,044,081 A | 3/2000 | Bell et al. |
| 6,137,834 A | 10/2000 | Wine et al. |
| 6,141,324 A | 10/2000 | Abbott et al. |
| 6,236,854 B1 | 5/2001 | Bradshaw |
| 6,269,107 B1 | 7/2001 | Jong |
| 6,332,153 B1 | 12/2001 | Cohen |
| 6,501,739 B1 | 12/2002 | Cohen |
| 6,505,169 B1 | 1/2003 | Bhgavath et al. |
| 6,608,820 B1 | 8/2003 | Bradshaw |
| 6,624,841 B1 | 9/2003 | Buchner et al. |

(Continued)

FOREIGN PATENT DOCUMENTS

EP 1 553 735 A1 7/2005

(Continued)

OTHER PUBLICATIONS

Joerg Ott et al.; "Extended RTP Profile for RTCP-based feedback (RTP/AVPF)"; Jun. 29, 2002; RCF; pp. 1-43 http://www.ietf.org/proceedings/01dec/I-D/draft-ietf-avt-rtcp-feedback-01.txt.

(Continued)

*Primary Examiner* — Melur Ramakrishnaiah
(74) *Attorney, Agent, or Firm* — Baker Botts L.L.P.

(57) ABSTRACT

In one embodiment, a method includes setting a target value for each audio source received from a plurality of remote participants to a telepresence conference, the gain coefficient array feeding a mixer associated with a loudspeaker associated with a display. A gain increment value is then set for each audio source, the gain increment value being equal to a difference between the target value and a current gain coefficient, the difference being divided by N, where N is an integer greater than one that represents a number of increments. Then, for each audio source, and for each of N iterations, the gain increment value is added to a current gain coefficient to produce a new current gain coefficient that is loaded into the mixer, such that after the N iterations the new current gain coefficient is equal to the target value. It is emphasized that this abstract is provided to comply with the rules requiring an abstract that will allow a searcher or other reader to quickly ascertain the subject matter of the technical disclosure.

20 Claims, 6 Drawing Sheets

U.S. PATENT DOCUMENTS

| | | |
|---|---|---|
| 6,650,652 B1 | 11/2003 | Valencia |
| 6,671,262 B1 | 12/2003 | Kung et al. |
| 6,675,216 B1 | 1/2004 | Quatrano et al. |
| 6,718,553 B2 | 4/2004 | Kenworthy |
| 6,735,572 B2 | 5/2004 | Landesmann |
| 6,744,785 B2 | 6/2004 | Robinett et al. |
| 6,771,644 B1 | 8/2004 | Brassil et al. |
| 6,771,657 B1 | 8/2004 | Elstermann |
| 6,775,247 B1 | 8/2004 | Shaffer et al. |
| 6,816,469 B1 | 11/2004 | Kung et al. |
| 6,865,540 B1 | 3/2005 | Faber et al. |
| 6,876,734 B1 | 4/2005 | Summers et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 7,127,487 B1 | 10/2006 | Wang et al. |
| 7,379,653 B2 | 5/2008 | Yap et al. |
| 2001/0000540 A1 | 4/2001 | Cooper et al. |
| 2002/0004841 A1 | 1/2002 | Sawatari |
| 2002/0087976 A1 | 7/2002 | Kaplan et al. |
| 2002/0163918 A1 | 11/2002 | Cline |
| 2003/0025786 A1 | 2/2003 | Norsworthy |
| 2003/0076850 A1 | 4/2003 | Jason, Jr. |
| 2003/0198195 A1 | 10/2003 | Li |
| 2004/0057449 A1 | 3/2004 | Black |
| 2004/0165527 A1 | 8/2004 | Gu et al. |
| 2004/0165710 A1 | 8/2004 | DelHoyo et al. |
| 2004/0199659 A1 | 10/2004 | Ishikawa et al. |
| 2004/0213152 A1 | 10/2004 | Matuoka et al. |
| 2005/0069102 A1 | 3/2005 | Chang |
| 2005/0078171 A1 | 4/2005 | Firestone et al. |
| 2005/0081244 A1 | 4/2005 | Barrett et al. |
| 2005/0138372 A1 | 6/2005 | Kajihara et al. |
| 2005/0259803 A1 | 11/2005 | Khartabil |
| 2006/0020995 A1 | 1/2006 | Opie et al. |
| 2006/0104458 A1 | 5/2006 | Kenoyer |
| 2006/0189337 A1 | 8/2006 | Farrill et al. |
| 2006/0259755 A1 | 11/2006 | Kenoyer |
| 2007/0064094 A1* | 3/2007 | Potekhin et al. ............ 348/14.08 |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |

FOREIGN PATENT DOCUMENTS

| | | | |
|---|---|---|---|
| WO | WO 00/19693 A1 | 4/2000 | |

OTHER PUBLICATIONS

T. Friedman et al.; "RTP Control Protocol Extended Reports (RTCP XR)"; Network Working Group; Nov. 2003; pp. 1-55 http://www.ietf.org/rfc/rfc3611.txt.

Handley et al. SIP: Session Initiation Protocol. RFC 2543. Mar. 1999. pp. 13 and 14. http://tools.ietf.org/html/rfc2543.

State Intellectual Property Office of the People's Republic of China, "The First Office Action," (PCT Application in Chinese National Phase), and English Translation, Application No. 200880108788.0, Sep. 7, 2011, 7 pages.

\* cited by examiner

AUDIO DIRECTIONALITY CONTROL FOR A MULTI-DISPLAY SWITCHED VIDEO CONFERENCING SYSTEM

TECHNICAL FIELD

The present disclosure relates generally to data networks and conferencing systems.

BACKGROUND

A multi-display, switched video ("telepresence") conferencing system is a system of components and endpoint devices that create a live, face-to-face meeting experience over a network that allows users to interact and collaborate in such a way that is seems as if all remote participants are present in the same room. Existing telepresence solutions, for example, combine life-size, true high-definition video images, CD-quality audio, a specially designed environment, and interactive elements to create the feeling of being "in person" at a virtual table with participants from remote locations. Some commercially-available telepresence systems are designed for small group meetings and one-on-one conversations, while others are designed for larger group meetings. Regardless of the size of the conference or meeting, the endpoints typically work in conjunction with a manager software application, which provides call scheduling, setup.

The goal of a telepresence conferencing system is to allow the participants to focus on the meeting, not the technology, and thus communicate naturally and effectively. One way that this is accomplished is by having the audio directionality track the video display, e.g., locating a loudspeaker adjacent each video display. The idea, in other words, is to have audio for a speaking participant come out of the loudspeaker adjacent to where the participant's image is being displayed. A problem arises, however, when a change to the display is triggered by a new speaking participant. In such cases, the audio from the new speaking participant usually precedes the video switching operation by a couple of seconds, due to the need to prevent video images from thrashing based on short talk spurts. Since the video switching system has yet to start rendering the video on the display, oftentimes the audio gets rendered in the wrong place (i.e., loudspeaker location). When the video is eventually displayed, the audio may abruptly jump from one loudspeaker to another, causing distracting artifacts that may disorient the participants or disrupt the virtual table experience.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
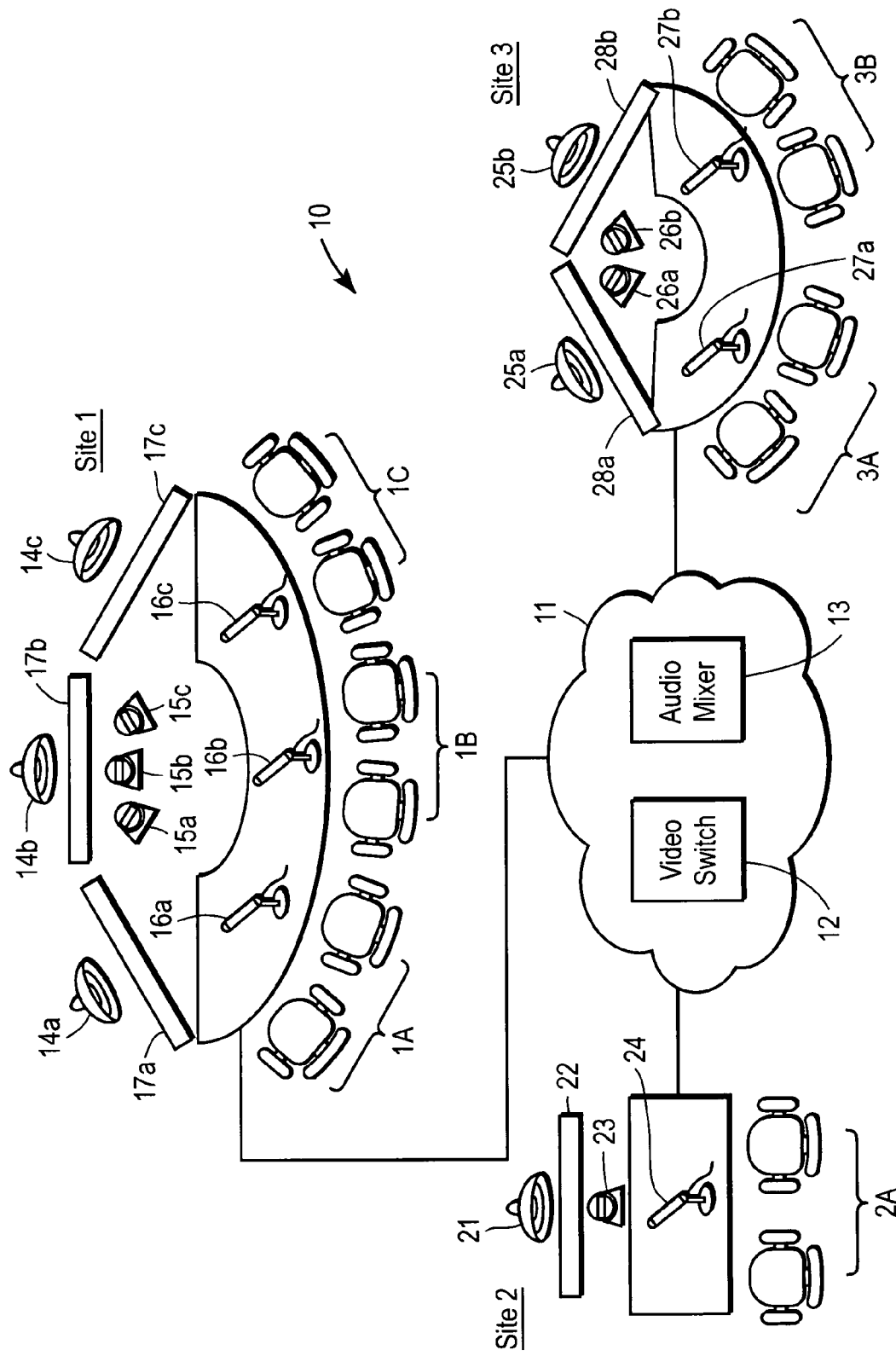
FIG. 1 illustrates an example multipoint telepresence conferencing system.

In the following description specific details are set forth, such as device types, system configurations, control methods, etc., in order to provide a thorough understanding of the present invention. However, persons having ordinary skill in the relevant arts will appreciate that these specific details may not be needed to practice the embodiments described.

A computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In the context of the present application, a telepresence conferencing system is a system comprising software and/or hardware (including firmware) components and endpoint devices integrated so as to create the feeling of being "in person" with conference participants in remote locations. A telepresence conference may involve point-to-point or multipoint calls over a variety of network connections and protocol types. The endpoints themselves comprise a specially designed environment with interactive elements that may include audio/video appliances (e.g., speakers, cameras, video displays/screens, microphones, etc.), lighting and seating for the participants around a virtual table, and software elements/applications facilitating scheduling, setup, and maintenance of the communication channels over one or more networks. Endpoint devices associated with a participant to a telepresence conference may also include audio-only devices (e.g., a digital phone) or any other device, component, element, or object capable of sending, receiving media packets, or otherwise participating in packet exchanges with a telepresence conferencing system.

Overview

In one embodiment, a telepresence conferencing system includes a plurality of loudspeakers arranged in a conference room around a virtual table. Each of the loudspeakers is positioned adjacent to a corresponding video display. (Other embodiments may have more or fewer loudspeakers than displays.) Each loudspeaker is also attached to a corresponding audio mixer. All audio sources (incoming from the participants at the remote locations) are input to the mixers. However, each mixer maintains a gain coefficient for each audio source, resulting in an audio "gain vector" or array across all the mixers. This gain vector is not used when determining which sources are the loudest current speakers, but is used to pre-scale the audio prior to mixing. Note that a change of displays is usually triggered by an indication that there is a new speaking participant in the system.

At any given time, the audio sources are classified as being in one of four states. The first state is a Silent/Background Noise, in which the audio source is typically suppressed from the mix, but which may be mixed as non-directional audio in certain embodiments. The second state is associated with detected speech that is sufficiently loud (above a predetermined threshold level) but which has not yet triggered a video switching operation. This speech—which may or may not result in a video source change, depending on the length or duration of the participant's speech—is mixed non-directionally into the conference. For instance, a participant making short affirmative/negative statements, such as "yes" or "no" will transition from the first state to the second state. Note that the second state is a transient state. The audio source will transition within a couple of seconds to either the first state (if the participant stops speaking) or to the fourth state (discussed below) in the event that the participant continues speaking beyond predetermined transition triggering threshold.

A third state is for audio-only sources that do not have a video source associated with them. These sources are mixed non-directionally.

The fourth state is for audio sources that are associated with a currently displayed video source. Audio from these sources are directionalized so that the speech emerges from the loudspeaker associated with the video display screen showing the speaking participant. Note that in this state it does not matter whether the audio is currently in a short talk spurt or not, as long as the associated video image of the participant remains displayed.

In one embodiment, the system comprises a method that establishes a vector of gain controls across the multiple mixers for each of the four states described above, and how those vectors change during state transitions. Undisplayed speakers show up non-directionally. When someone begins talking in the conference session, they become displayed to the other participants in the telepresence conference and their audio directionality is switched in a gradual, non-distracting manner until their speech is fully directionalized with respect to the loudspeaker associated with the display showing their image.

It should be understood that the telepresence conferencing system that is described in the present disclosure may be located anywhere on a packet-based communication network that connects each of the virtual conferencing tables together to create a shared experience. In some embodiments the telepresence conferencing system may comprise a single server that performs the various processing, video switching, and audio mixing functions described herein. In other embodiments, the telepresence conferencing system (including the sound processing/mixing functions) may be distributed among multiple servers, or, alternatively, implemented in a distributed fashion across the network, or one or more of the telepresence conferencing endpoint component devices.

FIG. 1 illustrates an example multipoint telepresence conferencing system 10 comprising three conference sites (Sites 1-3) interconnected via an Internet protocol (IP) network 11. Site 1 includes microphones 16a-16c, each one of which is appropriately positioned on a table to capture the speech of a corresponding group of participants. In this example, each group comprises two participants (two chairs), with microphone 16a being positioned directly in front of group 1A, microphone 16b being positioned directly in front of group 1B, and microphone 16c being positioned directly in front of group 1C. Other embodiments may have a single participant, or more than two participants, in each group.

Conference Site 1 also includes three cameras 15a-15c aimed so as to capture the image of the participants of groups 1A-1C, respectively, and three displays 17a-17c. A set of loudspeakers 14a-14c are correspondingly located adjacent respective displays 17a-17c. During a telepresence conference, displays 17 provide life-like images of active (or previously active) speakers participating in the conference session from one or more remote locations (i.e., Sites 2 & 3). The streaming video images of the participants are switched to the various sites utilizing a video switch 12, which is located on network 11.

An audio mixer 13, which is also located on network 11, produces output audio streams that represent the mixed speech of various selected participants (and in certain embodiments, background noises). Audio mixer 12, for example, may mix the audio transmissions to create output audio streams in accordance with the various audio states described above. Further examples of directionalized/non-directionalized mixing of audio sources for output by the loudspeakers of a particular conference site are provided below.

It is appreciated that in addition to video switch 12 and audio mixer 13, other components, such as a conferencing server or scheduling application (not shown), may also be located on network 11 as part of teleconferencing system 10.

Sites 2 & 3 are configured in a similar manner as Site 1, the only difference being the number of participant groups accommodated. For instance, Site 2 is shown including a loudspeaker positioned adjacent a display 22 on the opposite side of a table that seats a single group of participants 2A. Microphone 24 is positioned to capture audible speech of participant group 2A, with a camera 23 being positioned to capture video images of each of the participants in the group. Likewise, Site 3 is configured for two participant groups (3A & 3B), with microphones 27a & 27b and cameras 26a & 26b being arranged to capture the speech and images of the participants in groups 3A & 3B, respectively. As a conference site accommodating two participant groups, Site 3 is also configured with a pair of displays 28a & 28b and loudspeakers 25a & 25b.

In one embodiment, each loudspeaker is assigned or associated with a separate audio mixer having a set of gain controls that determine the directionality of the audio source output from that particular loudspeaker. Directional or non-directional mixing of audio sources is controlled by the finite state machine described above, and discussed further in connection with FIG. 4 below. In a specific implementation, changes to the directionality of a particular audio source is determined in accordance with a slewing algorithm, an example of which is described in connection with FIG. 5 below.

Figure 2:
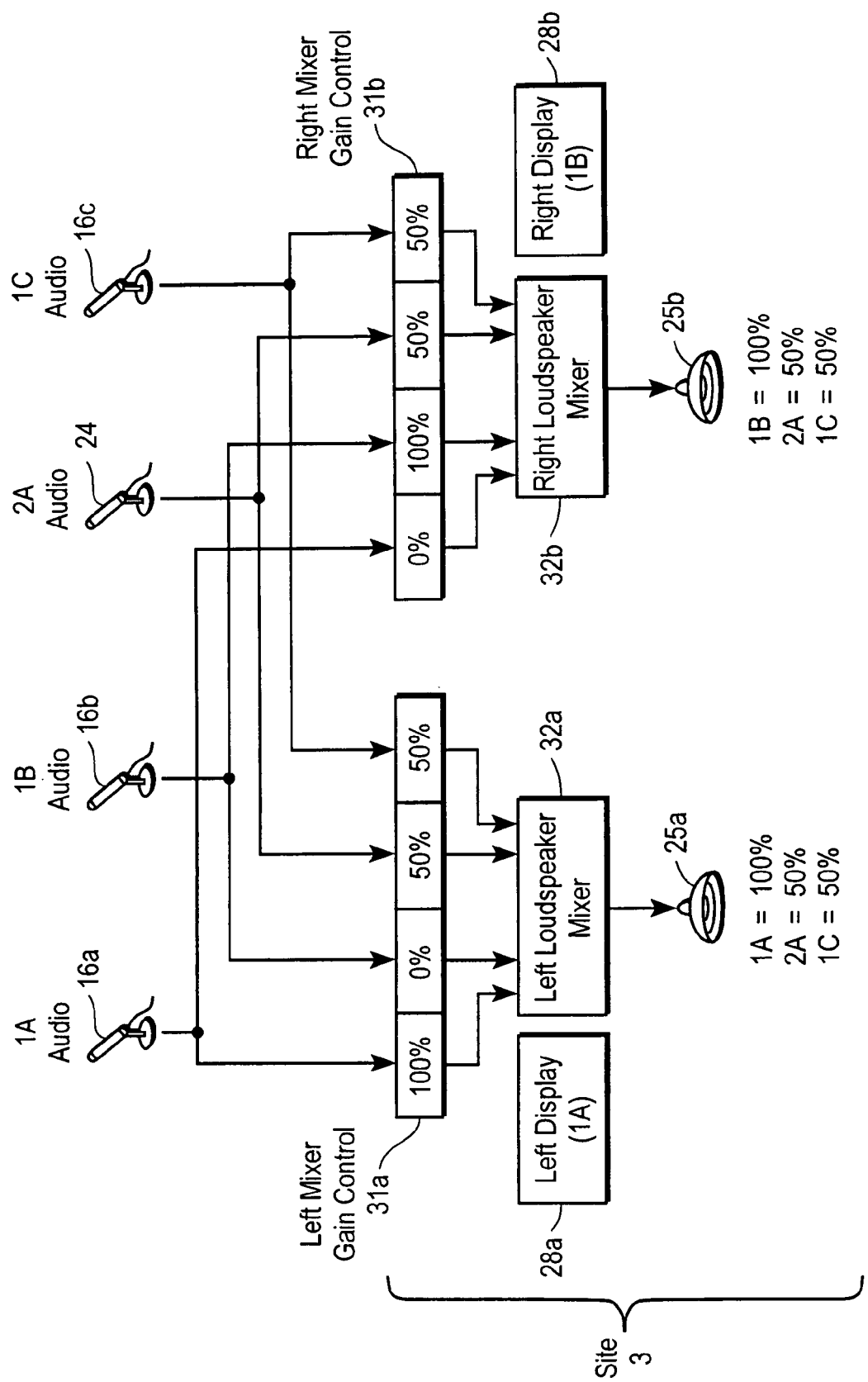
FIG. 2 illustrates an example apparatus for controlling audio directionality.

FIG. 2 illustrates an example apparatus for controlling audio directionality according to the embodiment described above. This example shows the conference dynamics from the perspective of Site 3. Left loudspeaker 25a is shown being driven by a left loudspeaker mixer 32a associated with a left mixer gain control array 31a that receives as inputs the various audio sources from the remote conference sites 1A, 1B, 2A and 1C (e.g., as captured by respective microphones 16a, 16b, 24 and 16c). The scenario presented by this example is as follows. A participant in group 1A is currently the active speaker (e.g., the loudest) in the conference session, such that 100% of the audio signal captured by microphone 16a is output by loudspeaker 25a. Concurrently, the image of the speaker captured by camera 15a is being displayed on display 28a. The image of the previous or most recent active speaker captured by camera 15b is being displayed on display 28b. A full 100% of the audio signal captured by microphone 16b (associated with participant group 1B) is therefore output by loudspeaker 25b, as controlled through right mixer gain control array 31 which feeds right loudspeaker mixer 32b.

Note that 0% of the audio signal produced by microphones 16a & 16b is included in the mixed output signals sent to loudspeaker 25b & 25a, respectively. In other words, the audio produced by loudspeaker 25a is directionalized with respect to the speech of participant group 1A, whose video image is shown on adjacent display 28a. At the same time, the audio produced by loudspeaker 25a is directionalized with respect to the speech of participant group 1B, whose video image is shown on adjacent display 28b. Note further that in this example, the speech or noise captured by microphones 24 and 16c is completely non-directionalized; that is, the audio signals from these sources is equally weighted (50%) by the left and right mixer gain control arrays, and split equally between the two loudspeakers 25a & 25b. The reason why these audio sources are non-directionalized by the telepresence conferencing system may be due to the fact that one or both of the microphones 24 and 16a is capturing background noise or short talk bursts (e.g., less than a certain predetermined time duration, such as where a participant says, "Yes" or "No" and then stops talking). To put it differently, in this embodiment the audio of any participant who is not currently being displayed is given no perceived directionality. This non-directionality is achieved by equally weighting the corresponding gain control array "buckets" (divided equally as among the number of non-directionalized audio sources.

Is appreciated that in the case where the system detects no appreciable sound originating from a particular group, that group may be excluded from the non-directional audio mix. By way of example, in FIG. 2 if no measurable sound was being picked up by microphone 24, the non-directionalized component of sound produced by loudspeakers 25a & 25b would only include the audio from participant group 2A (50%). It should be further understood that the gain factor applied depends upon the number of the loudspeakers at the particular site. For instance, Site 3 with three loudspeakers would apply a gain control of 33.33% for each non-directionalized audio source. In other words, for sites configured with three audio mixers/loudspeakers, the gain control bucket weighting for short talk bursts were background noise is 33.33%.

Figure 3:
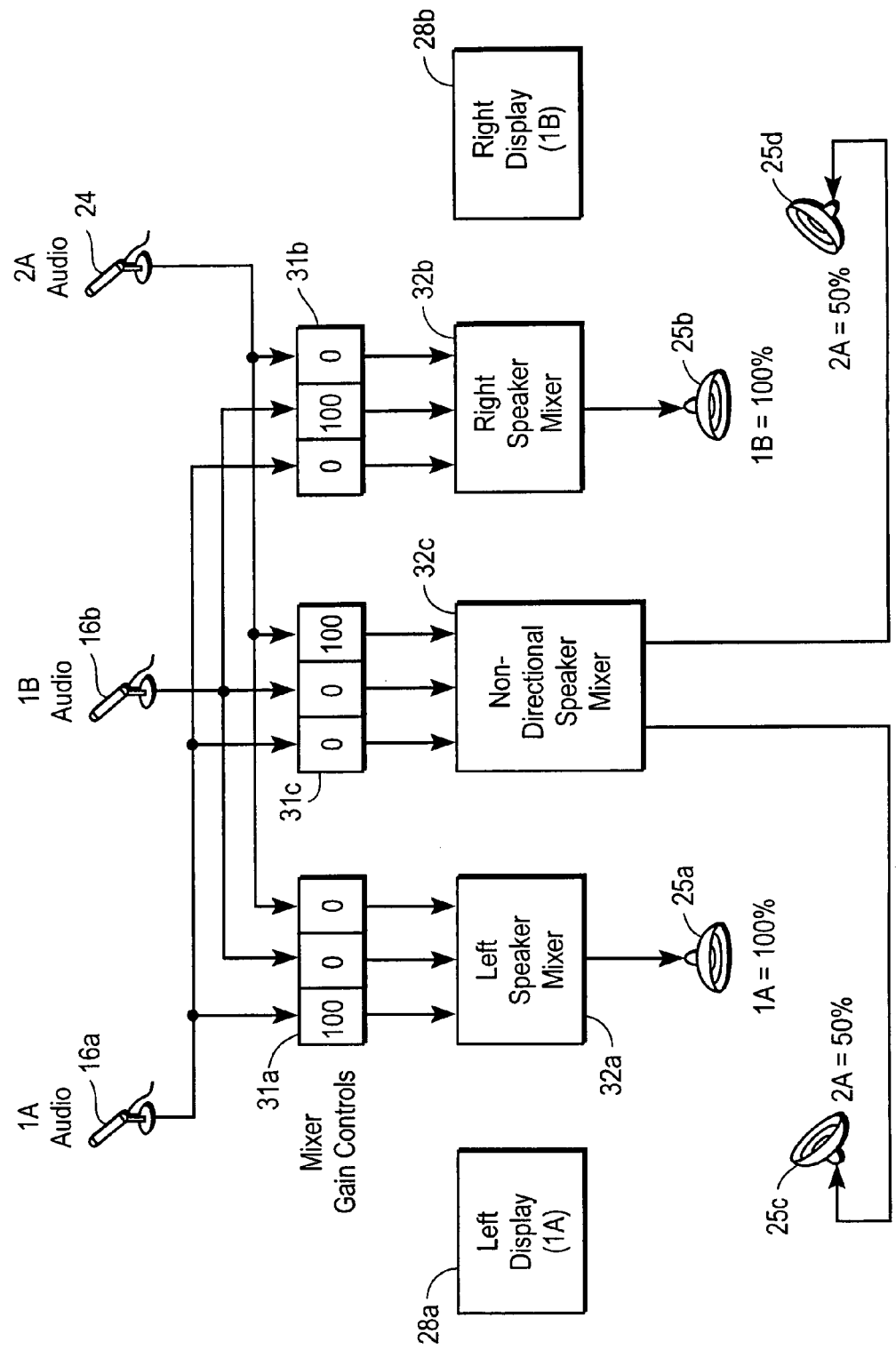
FIG. 3 illustrates another example apparatus for controlling audio directionality.

FIG. 3 illustrates another example apparatus for controlling audio directionality. This example is basically the same as that shown in FIG. 2, except that instead of mixing the non-directionalized speech (or noise) for equally distributed output by the loudspeakers (25a & 25b) associated with the displays (28a & 28b), a non-directional speaker mixer 32c is utilized to drive a pair of background or rear loudspeakers 25c & 25d equally (i.e., 50% each). Thus, mixer gain control array 31c is shown feeding 100% of the audio from non-directional source 24 (group 2A) into non-directional speaker mixer 32c and 0% from the current and previous active speaker sources 16a & 16b.

Figure 4:
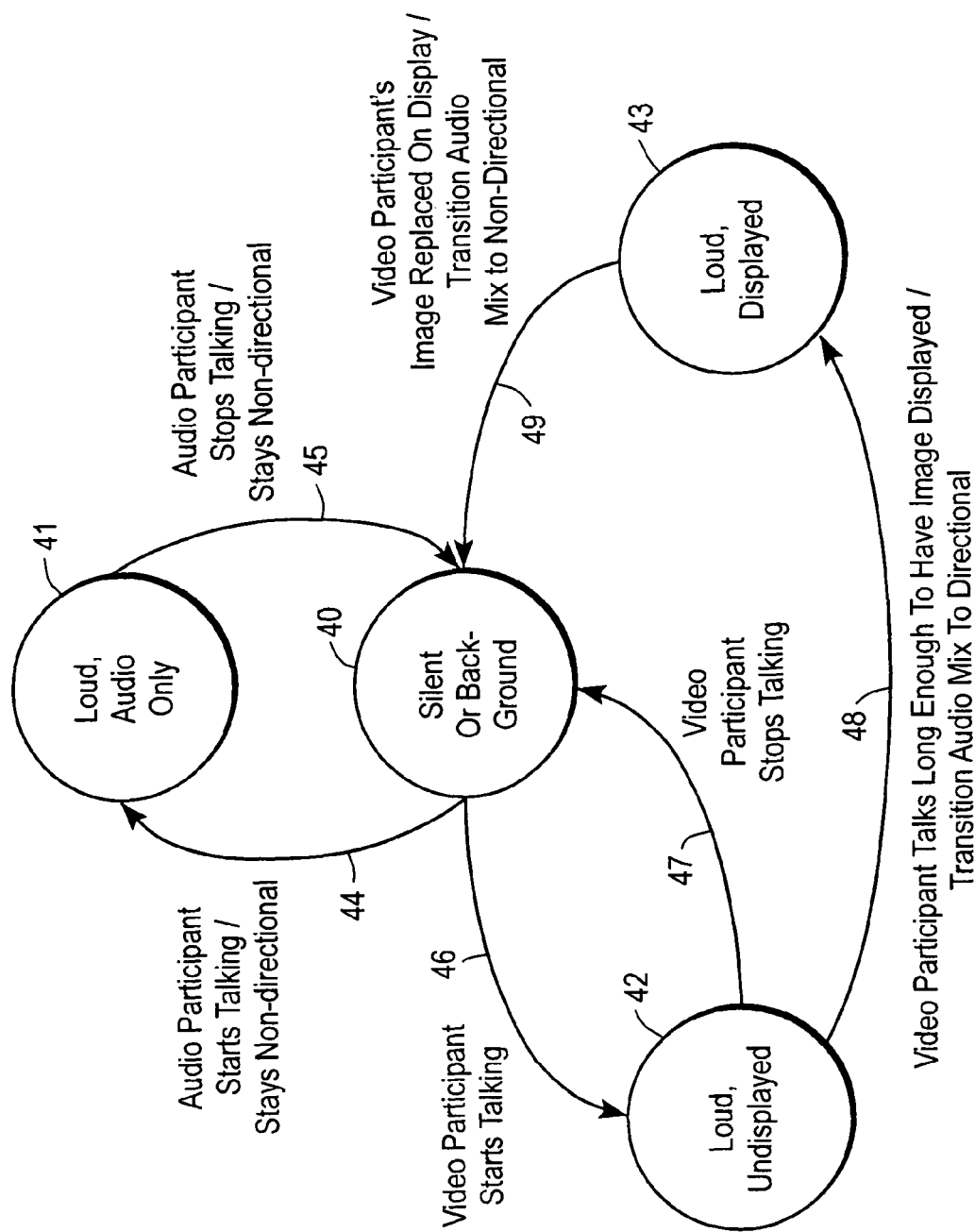
FIG. 4 illustrates an example participant mixer finite state machine.

FIG. 4 illustrates an example participant mixer finite state machine for the telepresence conferencing system of FIG. 1. Any audio source input into the system can be in one of the four states shown in FIG. 4. Practitioners in the art will appreciate that the state machine of FIG. 4 may be implemented as a method that controls the gain vectors that feed the audio mixers associated with each loudspeaker. The Silent or Background state 40 represents audio received from a source that is either completely silent or so low in amplitude or volume so as to eliminate it from consideration as active speaker status by the system. Basically, if the audio received from the source has amplitude less than a predetermined threshold, it is placed in the Silent or Background state 40. A participant (audio or video) may enter Silent state 40 by stopping talking, as indicated by transition arrows 45 & 47, from states 41 & 42, respectively. Alternatively, a video participant may transition from Loud, Displayed state 43 to Silent state 40 as a consequence of having their image replaced on a display screen, as indicated by transition arrow 49.

When a participant in Silent state 40 starts talking, they immediately transition to Loud, Undisplayed state 42, as shown by transition arrow 46. While in state 42 the audio source is output by the loudspeakers in the remote telepresence conferencing sites non-directionally. By way of example, any video participant who speaks in a short talk burst (e.g., "Ahaa") or whose speech has yet to exceed a predetermined time duration threshold (e.g., two seconds) is placed in Loud, Undisplayed state 42. If the video participant stops talking before the predetermined time duration threshold has been reached, they transition back to Silent state 40, as shown by transition arrow 47. On the other hand, if the video participant talks long enough (e.g., >2 seconds) the system identifies them as the current or active speaker, in the audio source is transitions to Loud, Displayed state 43, as shown by transition arrow 48. While in Loud, Displayed state 43 the audio source of the video participant is directional; that is, in the speech of the participant is output by the loudspeaker positioned adjacent to the display showing the participant's image.

Note that a participant in Loud, Displayed state 43 may not transition directly back to Loud, Undisplayed state 42. Rather, a video participant in Loud, Displayed state 43 transitions path to Silent state 40 when the system decides to replace that participant's image with the image of a new active speaker.

Loud, Audio Only state 41 is for audio only participants. When an audio only participant starts talking, they transition from Silent state 42 Loud, Audio Only state 41, as shown by transition arrow 44. While in state 41, the audio of the audio only participant stays non-directional. If the audio participant stops talking, they return to silent state 40, as shown by transition arrow 45.

Figure 5:
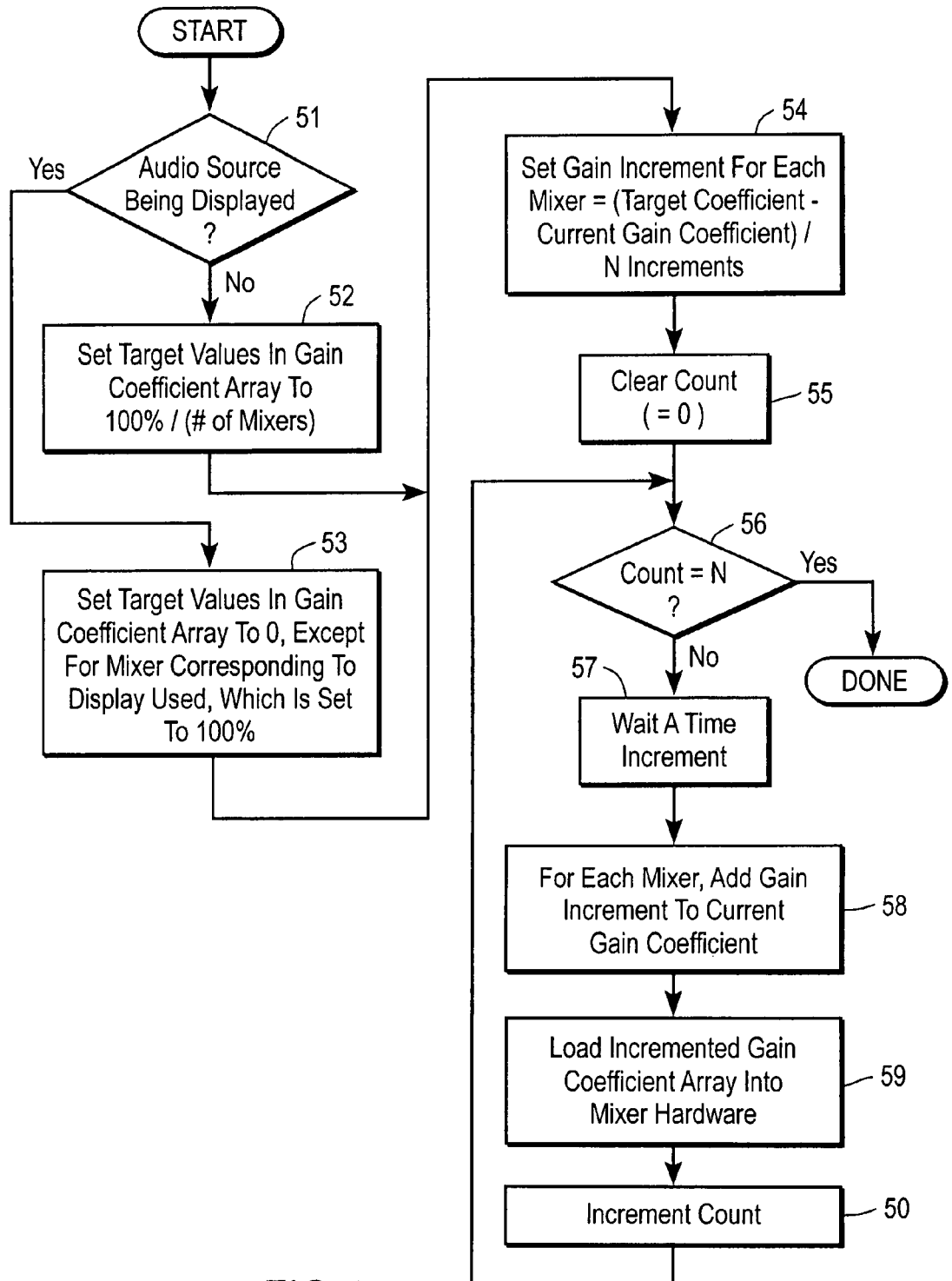
FIG. 5 illustrates an example method for smooth audio transitions in the apparatus of FIG. 2.

FIG. 5 illustrates an example method for smooth, slowly stewing audio transitions in the apparatus of FIG. 2. In one embodiment the audio transitions shown in FIG. 4 may be implemented in accordance with the method shown in FIG. 5. The process begins at decision block 51 with the system querying whether each of the audio sources is currently being displayed. If not, then the audio from these sources is non-directional and the system sets target values in the gain coefficient vector or array to 100% divided by the number of the audio mixers (block 52). For instance, if there are two audio mixers—one for a left loud loudspeaker and one for a right loudspeaker—then the target gain value for these non-directional audio sources is set to 50%.

In the event that an audio source is currently being displayed, then the next step is to set a target value in the gain coefficient array to zero, except for the mixer of the loudspeaker positioned adjacent to the display being used by the associated video participant; the gain for that mixer is set to 100%. This is shown occurring in block 53. In other words, the target gain value for all recently active speakers who are still being displayed is 0% and 100% for the current active speaker being displayed.

Once the target values have been set for the gain coefficient arrays that control the gain value applied to the audio source input to the various mixers, the method proceeds as a block 54, where the gain increment is set for each mixer. In this step, the gain increment for each mixer is set to be equal to the target coefficient minus the current gain coefficient divided by N, an integer equal to the number of increments. For example, the system may be configured such that all audio changes gradually occur over a time span of ten increments each of equal duration. Thus, if the current gain value of an audio source is 50% (non-directional with two loudspeakers) and the target value is 100% (directional, corresponding to a new active speaker), the gain increment for that mixer is set to 5%. In other words, the gain of the mixer for that particular audio source is increased by 5% for each increment or iteration in order to transition from the current state to the target state. For the same transition another audio source may transition from 100% to 0%, in which case the gain increment for that audio source is set to −10%.

Once of the gain increments have been set for each mixer, the count is cleared (set=0), as shown in block 55. Next, at decision block 56 system queries whether the current count increment is equal to N, the predetermined number of iterations for the transition (block 56). If so, then all of the N iterations have been completed (e.g., count=10) and the transition method is done. However, in the present example, since for the first time through the loop the count has just been cleared, the current count is equal to zero. That means that for this iteration, the process proceeds to block 57 where the system waits or pauses for a predetermined time increment or period (e.g., 250 ms). After the predetermined time period has elapsed, the gain increment is added to the current gain coefficient for each mixer (block 58). The incremented gain coefficient array value is then loaded into the mixer hardware (block 59), and the count is incremented (block 60) before returning back to decision block 56.

Note that when transitioning out of Loud, Displayed state back to Silent state 41, certain implementations may make the audio source (i.e., the video participant's voice) become instantaneously non-directional, since it is guaranteed that that particular audio source is no longer actively speaking.

In another embodiment, rather than having undisplayed audio sources be completely non-directional, the telepresence conferencing system weights each of the non-displayed audio sources based on which display screen their corresponding video images are most likely to appear. For example, at a telepresence conference site having two display screens, each having an associated loudspeaker, one display screen typically displays the video image of the current active speaker, with the other display screen showing the previous or most recent active speaker. In such a scenario, the system may predictively weight the undisplayed audio sources toward the display currently showing the previous active speaker.

In other words, the video subsystem may provide a prediction or indication of the specific display where an undisplayed participant (audio source) is most likely to appear should the participant continues to talk for a period of time exceeding the short talk burst threshold or limit (e.g., >2 sec). The audio subsystem then pre-directionalizes or biases the audio sources in the Silent and Loud, Undisplayed states 40 & 42, respectively. For instance, instead of a non-directionalized equal (50%-50%) split of the undisplayed audio sources between two loudspeakers, one of the loudspeakers may be predictively weighted such that a particular undisplayed audio source is output 60%-40% in favor of on loudspeaker over the other.

In a variation of the above-described embodiment, the video subsystem may pre-directionality query each separate audio stream whether the video system would change a different display based on a different audio source transitioning to Loud, Displayed state 43. That is to say, the system asks, for each audio source stream, where the next display change is likely to take place. But rather than providing a fully directional state vector for all audio in states 40 and 22, partial directionality is provided. For example, if audio in Silent state 40 and Loud, Undisplayed state 42 are expected to show up on loudspeaker 14c at Site 1 (see FIG. 1) if they transition to Loud, Displayed state 43, the system may utilize a gain vector such as 25%-25%-50% (as among loudspeakers 14a, 14b, and 14c, respectively). In such an implementation, there is no slewing of audio as a new current speaker is produced. However, there is an audio slew for the remaining undisplayed audio sources each time the video sources change or switch displays.

Figure 6:
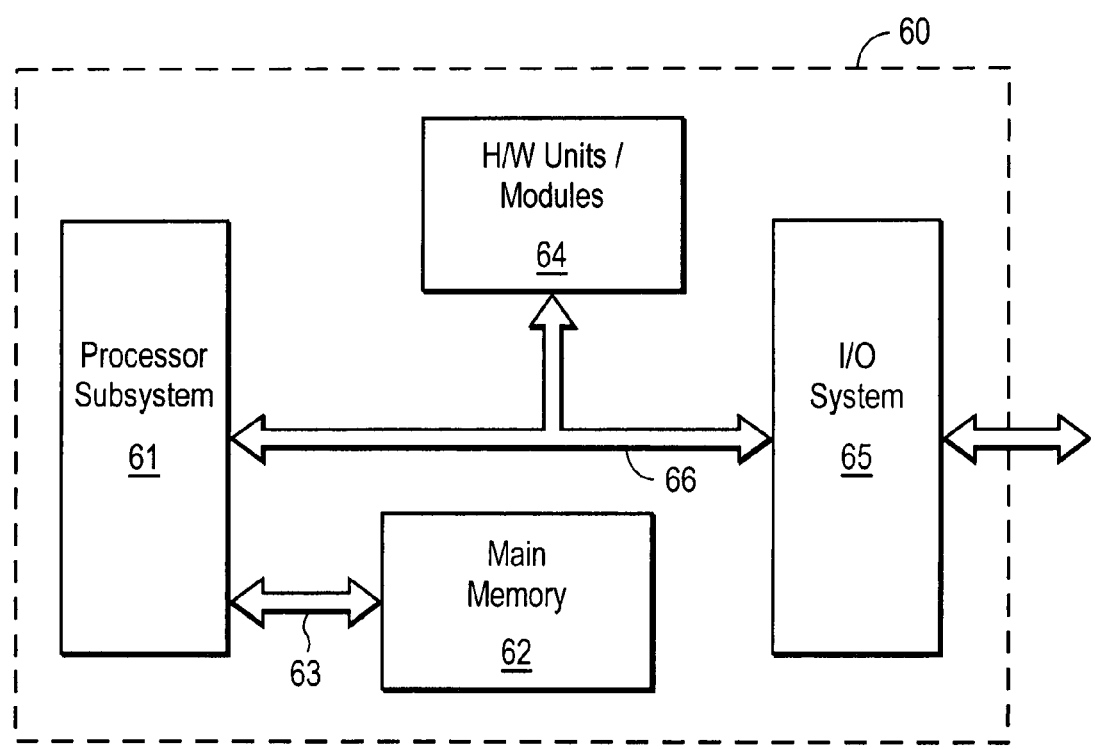
FIG. 6 illustrates basic components of an example node or network device.

FIG. 6 illustrates basic components of an example network device or node 60 (e.g., a telepresence conferencing server). Node 60 typically comprises a number of basic subsystems that includes a processor subsystem 61, a main memory 62 and an input/output (I/O) subsystem 65. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component interconnect (PCI) bus. Node 60 may also comprise other hardware units/modules 64 coupled to system bus 46 for performing additional functions. Processor subsystem 61 may comprise one or more processors and a controller device that incorporates a set of functions including a system memory controller, support for one or more system buses and direct memory access (DMA) engines.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. An apparatus comprising:
   first and second video displays to display images of remote participants to a telepresence conference;
   first and second loudspeakers respectively associated with the first and second video displays;
   first and second audio mixers each of which is coupled to receive audio sources input from the remote participants, each of the first and second audio mixers being operable to apply a gain coefficient to each audio source, the first and second audio mixers being operable to produce first and second mixed audio outputs to the first and second loudspeakers, respectively; and
   one or more processors to implement a finite state machine (FSM) comprising first, second, and third states that control the gain coefficient applied to each audio source by each of the first and second audio mixers, in the first state, which corresponds to a substantial silence or a background noise only, audio being suppressed or mixed as non-directional in the first and second mixed audio outputs; in the second state, which corresponds to a loud, undisplayed participant, audio being mixed as non-directional in the first and second mixed audio outputs; and in the third state, which corresponds to a loud, displayed participant, audio being mixed as directional with respect to either the first or second mixed audio outputs, depending on whether the first or second video displays an image of the loud, displayed participant.

2. The apparatus of claim 1 further comprising means for transitioning the first and second mixed audio outputs by changing the gain coefficient applied to each audio source by each of the first and second mixers from a current value to a target value responsive to a transition from the second state to the third state.

3. The apparatus of claim 2 wherein the means is further for computing a gain increment to be applied to each audio source by each of the first and second audio mixers during each of N iterations, where N is a number greater than 1.

4. The apparatus of claim 1 wherein the FSM further comprises a fourth state that corresponds to speech from an audio-only participant, in the fourth state the speech being mixed as non-directional in the first and second mixed audio outputs.

5. The apparatus of claim 1 wherein an audio source associated with a remote participant transitions from the first state to the second state when the remote participant starts talking.

6. The apparatus of claim 1 wherein an audio source associated with a remote participant transitions from the second state to the first state when the remote participant stops talking.

7. The apparatus of claim 1 wherein an audio source associated with a remote participant transitions from the second state to the third state responsive to the remote participant talking for a time duration that exceeds a predetermined time.

8. The apparatus of claim 1 wherein an audio source associated with a remote participant transitions from the third state to the first state when an image of the remote participant is replaced on either the first or second video display by another image.

9. The apparatus of claim 1 further comprising:
a third video display;
a third loudspeaker associated with the third video display; and a third audio mixer which is coupled to receive the audio sources input from the remote participants, the third audio mixer being operable to apply a gain coefficient to each audio source and produce a third mixed audio output to the third loudspeaker; and
wherein the one or more processors control the gain coefficient applied to each audio source input to the third mixer in accordance with the FSM.

10. A method comprising:
setting, at a gain coefficient array, a target value for each audio source received from a plurality of remote participants to a telepresence conference, the gain coefficient array feeding a mixer associated with a loudspeaker associated with a display, each target value comprising a percentage of a particular audio source;
setting a gain increment value for each audio source, the gain increment value being equal to a difference between the target value and a current gain coefficient, the difference being divided by N, where N is an integer greater than one that represents a number of increments; and
for each audio source, and for each of N iterations, adding the gain increment value to a current gain coefficient to produce a new current gain coefficient that is loaded into the mixer, such that after the N iterations the new current gain coefficient is equal to the target value.

11. The method of claim 10 further comprising waiting a time period prior to the adding of the gain increment value to the current gain coefficient.

12. The method of claim 10 further comprising changing an image displayed on the display to that of a different remote participant.

13. The method of claim 12 wherein the target value for the audio source associated with the different remote participant is 100% or fully directional with respect to the loudspeaker and the display.

14. The method of claim 12 wherein the target value for an audio source that is not being displayed on the display is set equal to 100% divided by a number of mixers at a site of the telepresence conference that includes the mixer, the loudspeaker and the display.

15. The method of claim 12 wherein the target value for an audio source that is not being displayed on the display is set equal to 100% divided by a number of mixers at a site of the telepresence conference that includes the mixer, the loudspeaker and the display, plus a certain percentage where a remote participant associated with the audio source is predicted to be displayed on the display in the event the remote participant talks for a time duration greater than a predetermined period of time.

16. One or more computer-readable non-transitory storage media embodying logic this is operable when executed by one or more computer systems to:
set, at a gain coefficient array, a target value for each audio source received from a plurality of remote participants to a telepresence conference, the gain coefficient array feeding a mixer associated with a loudspeaker associated with a display, each target value comprising a percentage of a particular audio source;
set a gain increment value for each audio source, the gain increment value being equal to a difference between the target value and a current gain coefficient, the difference being divided by N, where N is an integer greater than one that represents a number of increments; and
for each audio source, and for each of N iterations, add the gain increment value to a current gain coefficient to produce a new current gain coefficient that is loaded into the mixer, after the N iterations the new current gain coefficient being equal to the target value.

17. The logic of claim 16 wherein the media, when executed, is further operable to wait a time period prior to adding the gain increment value to the current gain coefficient.

18. The logic of claim 16 wherein execution of the logic is triggered in response to a different remote participant image being displayed by the display.

19. The logic of claim 18 wherein the target value for the audio source associated with the different remote participant image is 100% or fully directional with respect to the loudspeaker and the display.

20. The logic of claim 18 wherein the target value for the audio source, where the audio source is not being displayed on the display, is set equal to 100% divided by a number of mixers at a site of the telepresence conference that includes the mixer, the loudspeaker and the display.

* * * * *